US011089075B2

(12) United States Patent
Dasher et al.

(10) Patent No.: US 11,089,075 B2
(45) Date of Patent: Aug. 10, 2021

(54) OUTAGE NOTIFICATION WITH CLIENT CONTROL MODIFICATION IN AN ABR STREAMING NETWORK

(71) Applicant: ERICSSON AB, Stockholm (SE)

(72) Inventors: Charles Hammett Dasher, Lawrenceville, GA (US); Chris Phillips, Hartwell, GA (US)

(73) Assignee: ERICSSON AB, Stockholm (SE)

( * ) Notice: Subject to any disclaimer, the term of this patent is extended or adjusted under 35 U.S.C. 154(b) by 75 days.

(21) Appl. No.: 16/287,134

(22) Filed: Feb. 27, 2019

(65) Prior Publication Data

US 2019/0199770 A1 Jun. 27, 2019

Related U.S. Application Data

(63) Continuation of application No. 14/259,895, filed on Apr. 23, 2014, now Pat. No. 10,264,043.

(51) Int. Cl.
*G06F 15/16* (2006.01)
*H04L 29/06* (2006.01)
(Continued)

(52) U.S. Cl.
CPC .......... *H04L 65/602* (2013.01); *H04L 1/0014* (2013.01); *H04L 1/0015* (2013.01); *H04L 65/4084* (2013.01); *H04L 65/80* (2013.01); *H04L 67/02* (2013.01); *H04N 21/25841* (2013.01); *H04N 21/26258* (2013.01);
(Continued)

(58) Field of Classification Search
CPC ... H04L 65/602; H04L 65/4084; H04L 65/80; H04L 67/02; H04L 1/0014; H04L 1/0015; H04W 4/029; H04W 28/0226; H04N 21/25841; H04N 21/26258; H04N 21/41407; H04N 21/41422;
(Continued)

(56) References Cited

U.S. PATENT DOCUMENTS 6,404,738 B1   6/2002  Reininger et al.
7,418,007 B1 * 8/2008  Liu .................. H04N 21/23655
                                                       348/385.1
(Continued)

FOREIGN PATENT DOCUMENTS

CN      1110456 A     10/1995
CN    101212492 A      7/2008
(Continued)

OTHER PUBLICATIONS

Anonymous, "Adaptive bitrate streaming". Wikipedia, Oct. 30, 2013.
(Continued)

*Primary Examiner* — Thuong Nguyen

(57) ABSTRACT

A scheme for modulating an adaptive bitrate (ABR) streaming client engaged in a current ABR streaming session. In one implementation, a determination is made whether a wireless UE device executing the ABR streaming client is approaching a radio white spot area. If so, a video buffer of the ABR client is configured to preload lower quality video segments to last for the duration of the radio white spot area. One or more ABR client controls may be selectively deactivated while the wireless UE device is in the radio white spot area.

11 Claims, 10 Drawing Sheets

(51) Int. Cl.
  *H04W 4/029* (2018.01)
  *H04N 21/258* (2011.01)
  *H04N 21/262* (2011.01)
  *H04N 21/414* (2011.01)
  *H04N 21/433* (2011.01)
  *H04N 21/45* (2011.01)
  *H04N 21/472* (2011.01)
  *H04N 21/488* (2011.01)
  *H04N 21/6543* (2011.01)
  *H04N 21/845* (2011.01)
  *H04L 1/00* (2006.01)
  *H04L 29/08* (2006.01)
  *H04W 28/02* (2009.01)

(52) U.S. Cl.
  CPC . *H04N 21/41407* (2013.01); *H04N 21/41422* (2013.01); *H04N 21/4331* (2013.01); *H04N 21/4524* (2013.01); *H04N 21/47202* (2013.01); *H04N 21/4882* (2013.01); *H04N 21/6543* (2013.01); *H04N 21/8456* (2013.01); *H04W 4/029* (2018.02); *H04W 28/0226* (2013.01)

(58) Field of Classification Search
  CPC ........... H04N 21/4331; H04N 21/4524; H04N 21/47202; H04N 21/4882; H04N 21/6543; H04N 21/8456
  USPC ........ 709/217, 231, 234; 370/342, 512, 468, 370/465; 455/226.1
  See application file for complete search history.

(56) References Cited

U.S. PATENT DOCUMENTS

| | | | | |
|---|---|---|---|---|
| 9,769,231 | B1* | 9/2017 | Cotter | H04L 65/602 |
| 10,264,043 | B2* | 4/2019 | Dasher | H04W 4/029 |
| 2003/0198209 | A1* | 10/2003 | Schwengler | H04W 52/267 370/342 |
| 2005/0058160 | A1* | 3/2005 | Lee | H04H 20/93 370/512 |
| 2005/0175344 | A1* | 8/2005 | Huang | H04J 14/028 398/79 |
| 2007/0054640 | A1* | 3/2007 | Wada | H04H 60/11 455/226.1 |
| 2007/0076872 | A1* | 4/2007 | Juneau | H04N 21/4524 380/202 |
| 2008/0133767 | A1 | 6/2008 | Birrer et al. | |
| 2009/0158359 | A1 | 6/2009 | Shitanaka | |
| 2009/0280803 | A1* | 11/2009 | Choi | H04L 12/1877 455/426.1 |
| 2010/0121977 | A1 | 5/2010 | Kontola et al. | |
| 2010/0220818 | A1 | 9/2010 | Yamamoto et al. | |
| 2010/0290761 | A1 | 11/2010 | Drake et al. | |
| 2011/0093605 | A1 | 4/2011 | Choudhury et al. | |
| 2011/0235703 | A1* | 9/2011 | Labrozzi | H04N 21/8547 375/240.02 |
| 2012/0009890 | A1 | 1/2012 | Curcio et al. | |
| 2012/0062753 | A1* | 3/2012 | Hsieh | H04N 19/152 348/207.1 |
| 2012/0161752 | A1* | 6/2012 | Spooner | G01R 19/2513 324/142 |
| 2012/0172033 | A1 | 7/2012 | Hilton | |
| 2012/0214492 | A1 | 8/2012 | Mihály et al. | |
| 2012/0265847 | A1* | 10/2012 | Swenson | H04N 19/156 709/217 |
| 2012/0284745 | A1 | 11/2012 | Strong | |
| 2013/0054827 | A1* | 2/2013 | Feher | H04L 29/06503 709/231 |
| 2013/0138367 | A1* | 5/2013 | Boivin | G01R 31/08 702/59 |
| 2013/0334881 | A1 | 12/2013 | Jones et al. | |
| 2014/0066046 | A1 | 3/2014 | Keshavdas et al. | |
| 2014/0095943 | A1 | 4/2014 | Kohlenberg et al. | |
| 2014/0325550 | A1* | 10/2014 | Winograd | H04N 21/8456 725/19 |
| 2015/0050925 | A1 | 2/2015 | Tapia | |
| 2015/0085875 | A1* | 3/2015 | Phillips | H04N 21/2402 370/465 |
| 2015/0095955 | A1* | 4/2015 | Singh | H04N 21/44004 725/62 |
| 2015/0279322 | A1* | 10/2015 | Douglas | G06K 9/4661 345/212 |
| 2015/0312301 | A1* | 10/2015 | Dasher | H04L 65/4084 709/217 |
| 2019/0199770 | A1* | 6/2019 | Dasher | H04N 21/4331 |

FOREIGN PATENT DOCUMENTS

| | | |
|---|---|---|
| CN | 101552684 A | 10/2009 |
| EP | 2073486 A1 | 6/2009 |

OTHER PUBLICATIONS

Zambelli: "IIS Smooth Streaming Technical Overview Author: Smooth Streaming Technical Overview" Mar. 1, 2009.

* cited by examiner

OUTAGE NOTIFICATION WITH CLIENT CONTROL MODIFICATION IN AN ABR STREAMING NETWORK

This application is a continuation of U.S. application Ser. No. 14/259,895, filed Apr. 23, 2014, the disclosure of which is fully incorporated herein by reference.

REFERENCE TO RELATED APPLICATION(S)

This application discloses subject matter that is related to the subject matter of the following commonly-owned U.S. patent application(s): (i) "ABR VIDEO WHITE SPOT COVERAGE SYSTEM AND METHOD", application Ser. No. 14/200,491, filed Mar. 7, 2014, in the name(s) of Johan Köhli et al.; (ii) "ADAPTIVE VIDEO WHITE SPOT LEARNING AND USER BANDWIDTH DELIVERY CONTROL SYSTEM", application Ser. No. 14/036,841, filed Sep. 25, 2013, in the name(s) of Christopher Phillips et al.; (iii) "CONFLICT DETECTION AND RESOLUTION IN AN ABR NETWORK", application Ser. No. 14/194,868, filed Mar. 3, 2014, in the name(s) of Christopher Phillips et al.; and (iv) "CONFLICT DETECTION AND RESOLUTION IN AN ABR NETWORK USING CLIENT INTERACTIVITY", application Ser. No. 14/194,918, filed Mar. 3, 2014, in the name(s) of Christopher Phillips et al., each of which is hereby incorporated by reference in its entirety.

FIELD OF THE DISCLOSURE

The present disclosure generally relates to communication networks. More particularly, and not by way of any limitation, the present disclosure is directed to a scheme for managing coverage in a wireless network environment configured to facilitate adaptive bitrate (ABR) streaming of content.

BACKGROUND

While mobile radio data network coverage is widespread, there may be areas where data coverage is low or where there is not enough channel noise due to various factors such as, e.g., structures, interference, weather, etc. Although phone calls can generally overcome these issues by switching to a different network protocol, video delivered over data networks generally cannot. Accordingly, when consuming video via ABR streaming while traveling though an area of low coverage or poor signal quality, it becomes necessary to manage a user's experience in a satisfactory manner.

SUMMARY

The present patent disclosure is broadly directed to systems, methods, apparatuses, devices, and associated non-transitory computer-readable media for managing ABR streaming sessions in a wireless network environment that may have potential video outage areas (also referred to herein as "white spots"). In one aspect, an embodiment of a method for modulating an ABR streaming client engaged in a current ABR streaming session is disclosed. The claimed method involves, inter alia, determining that a wireless UE device executing the ABR streaming client is approaching or will be in a radio white spot area (i.e., video outage area). The ABR client's video buffer may be preloaded or "primed" with lower quality segments that may be determined to last for the estimated duration of video outage. Further, one or more ABR client controls may be deactivated while the wireless UE device is in the radio white spot area in order to help mitigate potentially adverse behavior that may result from engaging the client controls while playing out of the primed buffer.

In another aspect, an embodiment of a wireless UE device comprises an ABR buffer for storing media segments encoded at different bitrates pursuant to an ABR streaming session and an ABR client player configured to play back content out of the ABR buffer. The claimed wireless UE device further comprises one or more processors coupled to a persistent memory having program instructions for controlling the ABR client player to disable at least one ABR client player control when the wireless UE device is in a radio white spot area.

In a still further aspect, an embodiment of a network subsystem configured to modulate an ABR streaming client is disclosed. The claimed subsystem may be implemented as part of a radio network controller, and may include, inter alia, an ABR stream delivery server for facilitating ABR streaming sessions in a wireless radio network environment; a video outage and Quality of Service (QoS) datastore having geographic location data pertaining to areas where radio coverage is suboptimal for streaming content to a wireless UE device executing the ABR streaming client; and a video outage awareness and notification node coupled to the ABR stream delivery server and the video outage and QoS datastore. The video outage awareness and notification node is adapted to determine, responsive to a location update from the wireless UE device, that the wireless UE device is approaching a radio white spot area; and to provide a notification to the wireless UE device that one or more ABR client controls will be disabled while the wireless UE device is in the radio white spot area.

In still further aspects, one or more embodiments of a non-transitory computer-readable medium containing computer-executable program instructions or code portions stored thereon are disclosed for performing one or more embodiments of the methods set forth above when executed by a processor entity of a network node, element, UE device, and the like, mutatis mutandis. Further features of the various embodiments are as claimed in the dependent claims.

Advantages of the present invention include, but not limited to, the ability to adapt to ad hoc issues such as, e.g., inclement weather interference, variable low radio quality, noise, etc. that may be encountered in a wireless ABR streaming environment, wherein there is usually enough bandwidth in normal conditions to both pre-cache content as well as watch a video or other requested programming simultaneously. By detecting potential video outage areas in a wireless network and appropriately notifying the users in a preemptive fashion (e.g., before the user attempts to change ABR player controls in an outage area), better user experience may be achieved in the ABR streaming environment, for example. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
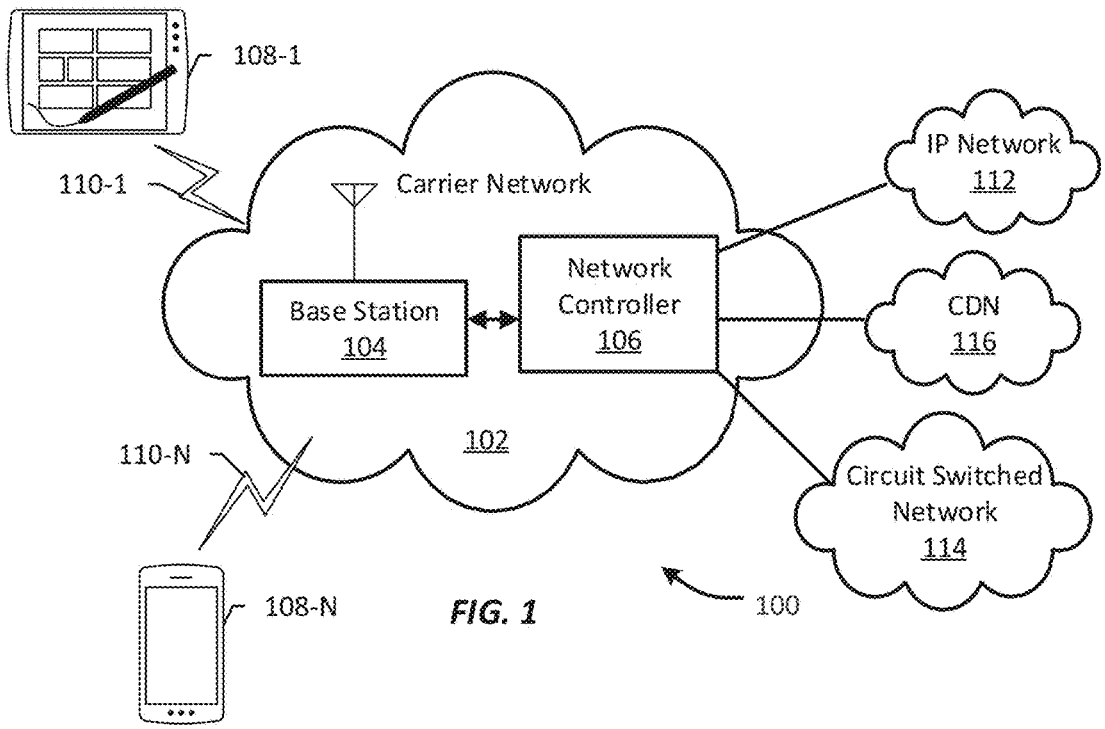
FIG. 1 depicts an example wireless network environment for facilitating ABR streaming and ABR client control modulation according to one or more embodiments of the present patent application.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. As such, some network elements may be disposed in a wireless radio network environment whereas other network elements may be disposed in a public packet-switched network infrastructure, including or otherwise involving suitable content delivery network (CDN) infrastructure. Accordingly, some network elements may comprise "multiple services network elements" that provide support for multiple network-based functions (e.g., A/V media management, session control, Quality of Service (QoS) policy enforcement, bandwidth scheduling management, subscriber/device policy and profile management, content provider priority policy management, streaming policy management, advertisement push policy management, and the like), in addition to providing support for multiple application services (e.g., data and multimedia applications). Subscriber end stations or client devices may comprise any device configured to execute, inter alia, a streaming client application (e.g., an ABR streaming client application) for receiving content from one or more content providers, e.g., via mobile telephony networks. Such client devices may therefore include portable laptops, netbooks, palm tops, tablets, mobile phones, smartphones, multimedia phones, Voice Over Internet Protocol (VOIP) phones, mobile/wireless user equipment, portable media players, portable gaming systems or consoles (such as the Wii®, Play Station 3®, etc.) and the like that may access or consume content/services provided over a content delivery network via a suitable high speed wireless connection for purposes of one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example wireless network environment 100 for facilitating ABR streaming and ABR client control modulation according to one or more embodiments of the present patent application. A plurality of exemplary wireless or mobile devices or user equipment (UE) devices 108-1 to 108-N are shown as being operational in the wireless environment 100 comprising an exemplary mobile communication network or carrier network 102. In the discussion herein, the terms "wireless network," "mobile communication network," "carrier network", or terms of similar import may be used interchangeably to refer to a wireless communication network (e.g., a cellular network, a proprietary data communication network, a corporate-wide wireless network, etc.) that facilitates voice and/or data communications with different types of wireless mobile devices (e.g., devices 108-1 to 108-N). In one embodiment, such devices may be a User Equipment (UE) or a Mobile Station (MS) (also referred to by various analogous terms such as "mobile handset," "wireless handset," "mobile device," "mobile terminal," etc.) capable of receiving adaptively streamed/delivered audio-visual content from the network 102 and playing it using a local ABR client player executing thereon. In some other embodiments, wireless mobile devices may comprise portable gaming devices, electronic tablets, laptops equipped with suitable wireless modems, e-readers, and the like, as alluded to previously. To the extent a wireless UE device may include an ABR client player for effectuating video streaming, it may also be referred to as an ABR client device or mobile client device, or simply a client, depending on the context for purposes of the present patent application.

UE devices 108-1 to 108-N are shown to be in wireless communication (via respective radio links 110-1 to 110-N) with the wireless network 102 through one or more base stations, e.g., base station (BS) 104 (also interchangeably referred to herein as a "mobile communication network node" or simply a "node") of the network 102. The example base station 104 may provide radio interface (in the form of suitable Radio Frequency (RF) links depending on the particular mobile communications technology) to devices 108-1 to 108-N via appropriate antenna elements. By way of example, the base station 104 may comprise a base station in a Third Generation (3G) network, or an evolved Node-B (eNodeB or eNB) when the carrier network is a Third Generation Partnership Project's (3GPP) Long Term Evolution (LTE) network. In some example embodiments, the base station 104 may also include a site controller, an access point (AP), a radio tower, or any other type of radio interface device capable of operating in a wireless environment. In addition to providing air interface or wireless channel (e.g., as represented by wireless links 110-1 to 110-N) to the wireless UE devices, the communication node (or base station) 104 may also perform radio resource management (as, for example, in case of an eNodeB in an LTE system). In case of a 3G carrier network, example base station 104 may include functionalities of a 3G base station along with some or all functionalities of a 3G Radio Network Controller (RNC). Additionally, base station 104 may be part of an Access Network (AN) (not shown) portion of the carrier network 102, wherein the AN may be a 3GPP cellular AN or an International Mobile Telecommunication (IMT) Radio Access Network (RAN) such as, for example, a Universal Terrestrial Radio Access Network (UTRAN), an Evolved-UTRAN (E-UTRAN), a GSM/EDGE RAN (GERAN), a Worldwide Interoperability for Microwave Access (WiMAX) network, and the like.

Example carrier network 102 may include a network controller 106 coupled to the base station 104 for providing logical and control functions relative to, e.g., roaming support and/or terminal mobility management, subscriber account management, billing, etc., as well as accessing of external networks or communication entities and delivery of streamed AN content from one or more content sources. By way of example, connectivity to other networks or infrastructures such as, for instance, the Internet 112, CDN 116 and a circuit-switched landline telephone network (i.e., a Public-Switched Telephone Network or PSTN) 114, is illustrated. In case of an LTE carrier network, network controller 106 may include some or all functionalities of an Access Gateway (AGW) or an Evolved Packet Core (EPC) node. In certain embodiments, such functionalities may comprise, for example, an IMT core network functionality or an ETSI TISPAN (European Telecommunications Standards Institute TIPHON (Telecommunications and Internet Protocol Harmonization over Networks) and SPAN (Services and Protocols for Advanced Networks)) core network functionality. Regardless of a particular implementation of the carrier network, base station 104 and/or network controller functionality 106 may be configured to facilitate, in conjunction with or independent of one or more external network entities and databases, methodologies for controlling delivery of ABR streaming sessions as well as modulating ABR client player controls in potential video outage areas that may be encountered in the wireless network environment 100, as will be set forth in detail hereinbelow.

Figure 2:
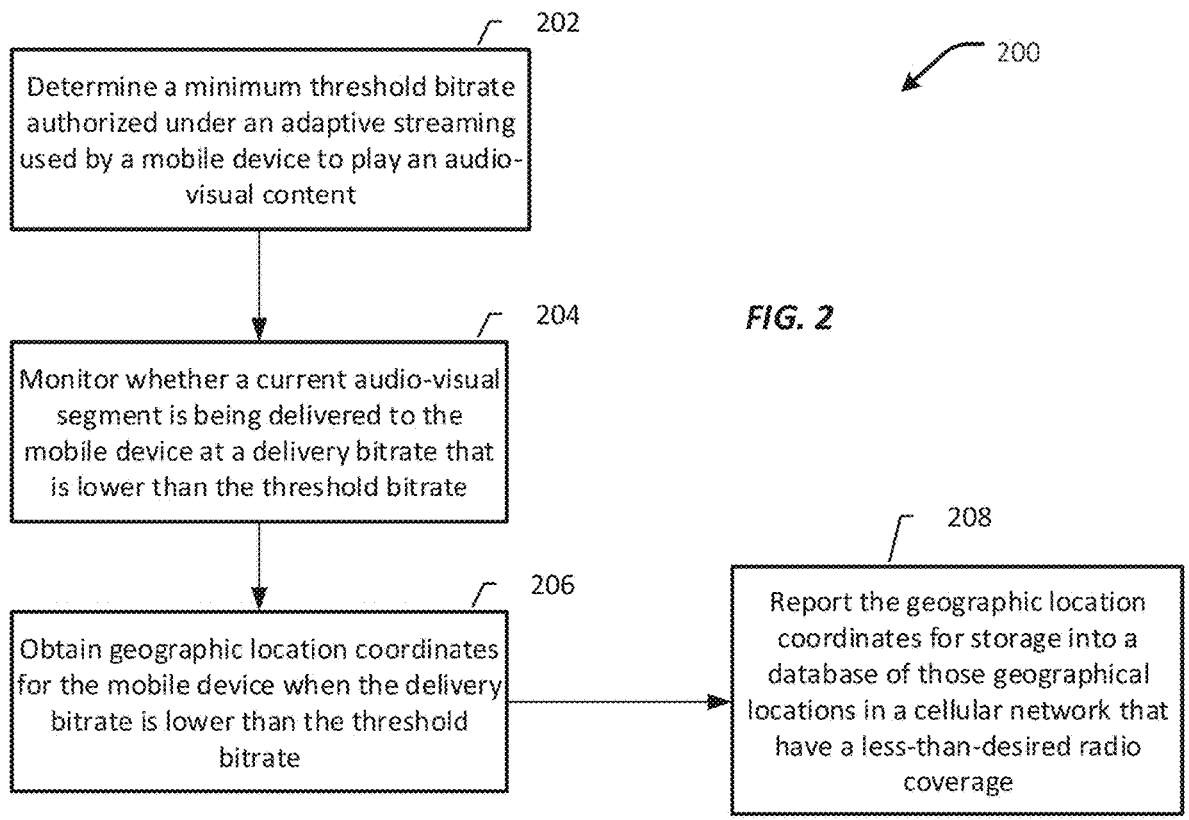
FIG. 2 depicts a flowchart of an example methodology for building a database of video outage areas (i.e., radio white spot areas) according to an embodiment for purposes of the present patent application.

FIG. 2 depicts a flowchart of an example methodology 200 for building a database of video/ABR outage areas (i.e., radio white spot areas) according to an embodiment for purposes of the present patent application. As shown at block 202 in FIG. 2, a network entity (e.g., in the carrier network 102 or a subscriber policy management node associated with CDN 116 of FIG. 1) may initially determine a minimum threshold bitrate (e.g., for enforcing a QoS policy) authorized under an adaptive streaming technique used by a mobile device (e.g., wireless UE device 108-1) to play an audio/visual content file or program. The network entity may then monitor whether a current audio/visual segment is being delivered to the wireless UE device at a delivery bitrate that is lower than the threshold bitrate (block 204). When the delivery bitrate of the current streaming segment is determined to be lower than the threshold bitrate, the network entity may obtain the geographic location coordinates for the wireless UE device (block 206) because such reduced delivery bitrate may indicate a less than acceptable service, possibly due to various radio signal quality conditions, including a radio outage condition. Thereafter, the network entity may report those geographical location coordinates for storage into a database (block 208), which may be configured to maintain a dataset of geo-locations (e.g., in the form of location coordinates) with respect to the geographical area of the network 102 that have a less-than-desired radio coverage, Those skilled in the art will recognize that the dataset of video outage areas is not static and may not necessarily mean that there is a complete radio outage at the reported locations. Depending on variable signal parameters, improvements to the infrastructure, changes in the environmental and structural elements (e.g., buildings, towers, etc.) within the wireless network environment, and the like, a location database of potential white spot areas may be continually and/or dynamically updated as needed (i.e., by way of a learning process). Furthermore, white spot area databases and/or server systems hosting such databases may be provided with suitable application program interfaces or APIs that facilitate interaction with other network entities and services, e.g., including bandwidth control.

Those skilled in the art will recognize that if the network entity (e.g., network controller 106 in FIG. 1) serving a mobile device determines that the mobile device is heading toward an outage area (e.g., while roaming in a vehicle) where data coverage is poor or less-than-desired, the network entity may calculate how long it would take for that vehicle to reach closest to the video outage area based on the vehicle's current speed and direction of travel. Such a calculation may yield, among others, parameters such as "Time_to_video_outage_location" or "Time_to_location", which may be used to further calculate how long the network entity should wait before forcing (e.g., by limiting the bandwidth of the delivered data) or instructing (e.g., via a message) the mobile device to switch to a lower bitrate within the manifest file associated with a streaming session. For example, a UE-specific message may be sent from the network entity informing the UE to switch to the lowest bitrate in the currently-played video segment's manifest file while traversing the white spot area.

In one embodiment, by preemptively forcing a bitrate change, the network entity may enable the mobile device's client player to fill available empty portions of its playback buffer with lower quality video segments, resulting in a larger number of segments pre-downloaded. With more segments in its playback buffer, the client can continue the video playback for a much longer time than with fewer segments at a higher bitrate stream. Thus, by forcing the client to the lowest bitrate and enabling it to fill its internal buffer with lower quality video segments to maximize the video playout length, the network entity may enable the mobile client to navigate through the outage area (assuming that the vehicle carrying the mobile device reasonably maintains the same speed of travel/heading) without video data disruptions. In one embodiment, such "advance" filling of client's playback buffer (with lower quality video segments) just prior to the client device's entry into an outage area may be sufficient to enable the client device to cross that area without running out of video segments during transit. In another embodiment, the network entity may perform a different type of calculation to determine the "proper" or "most suitable" bitrate based on a calculated length of time to navigate the outage area. This calculation may prevent the mobile client from going to the absolute worst video quality (e.g., at the lowest bitrate in the manifest) if the calculated time to navigate through the outage area based on various segment bitrates can settle on a higher quality of video (at a higher bitrate) and still fill the client's playback buffer with enough playout time to make it through the outage area without video interruptions.

Because encoded content segments may be defined for the client player across multiple bitrates in ABR streaming, a key consideration is to "prime" the mobile client based on available bitrate(s) at a location before entering an outage area. In one implementation, priming the client may commence after it has been determined that the system cannot achieve the highest bitrate of the manifest but at the highest bit rate that has been determined to be possible at a particular location. For example, a client might be able to get 2 megabits per second (Mbps or Mbs) but it is desired that the client buffer be primed for the 800 Kbs stream at a minimum. In an example manifest having 400 Kbs, 800 Kbs, and 1.3 Mbs formats, streaming could be throttled at 1.2 Mbs, allowing the buffer to be primed as fast as possible but at 800 Kbs.

By way of an example implementation, a parameter called "Time_to_lower_bitrate" may be calculated based on the "Time_to_location" parameter mentioned above as well as available lowest segment delivery bitrate values so that enough video segments may be delivered to the mobile UE client while is still under acceptable data coverage (from the serving base station infrastructure) prior to entering the video outage area. The network entity may ascertain whether the client device's actual physical location (e.g., as reported by the device itself or as determined using one or more known or heretofore unknown location/positioning methods) has reached a "Calculated Location" (i.e., the location the UE-carrying vehicle may reach, assuming no significant change in the direction or speed of travel, where the bitrate is to be lowered) to force the lower delivery bitrate. If there is a change in one or more variables (e.g., a significant change in travel direction or speed), the network entity may return to its monitoring of the streaming delivery session as well as the mobile client's parameters to recalculate appropriate parameters to determine adjusted times where the lowered delivery rates should start. Accordingly, by selecting the lowest authorized bitrates in the manifest, and thereby enabling the mobile client to fill its video playback buffer with sufficient number of video segments (albeit of lower quality), sufficient video buffer priming may be provided to last through a video outage area.

Figure 3:
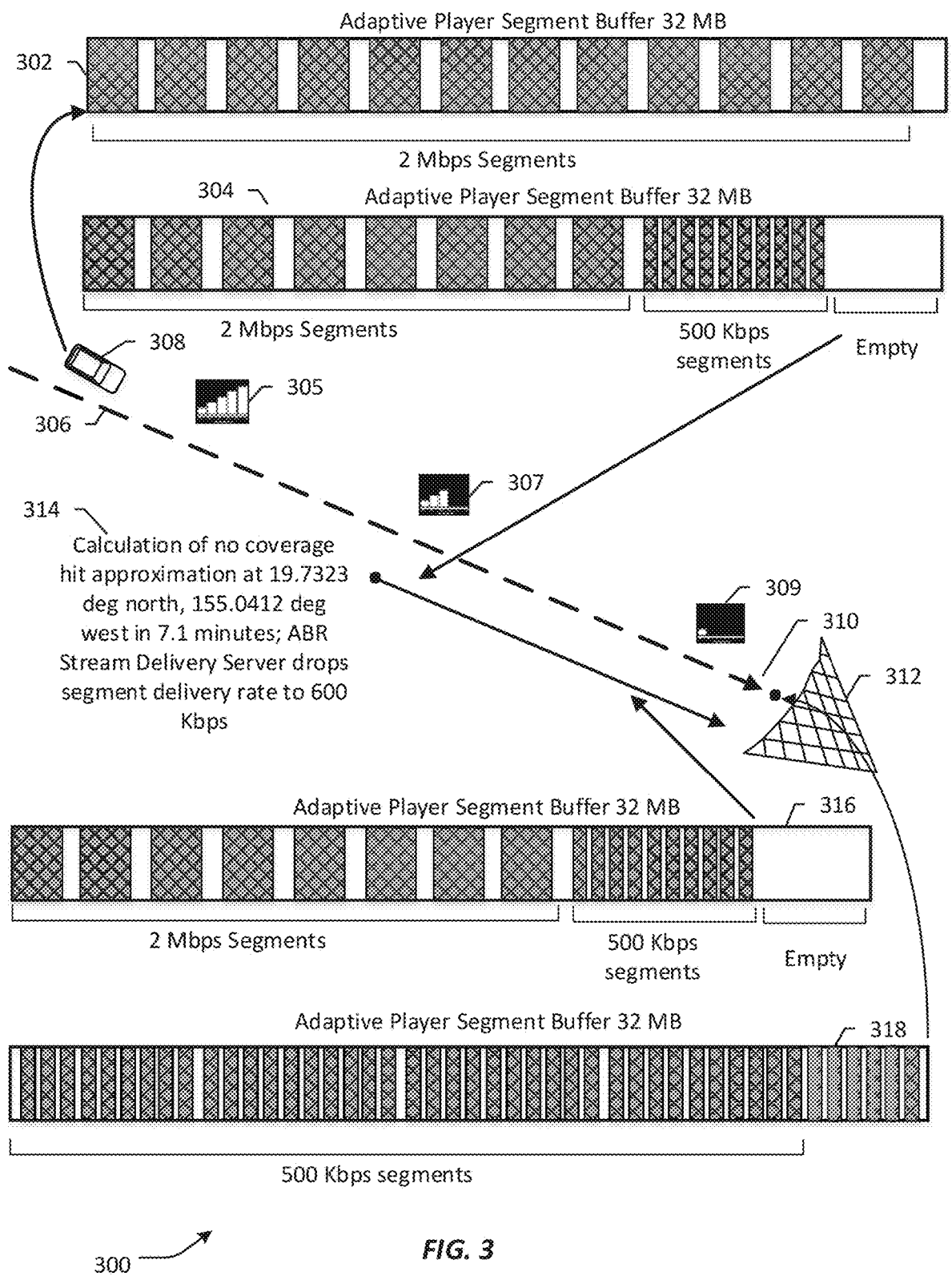
FIG. 3 depicts an example environment where occurrence of a potential video outage area may be estimated for notifying an ABR client according to an embodiment for purposes of the present patent application.

Referring to FIG. 3 now, an exemplary pictorial representation 300 shows how the forced bitrate control scheme may enable a UE-carrying vehicle 308 to have an uninterrupted playback of the ABR-delivered video content while transiting through a video outage region 312. Initially, the UE may be downloading ABR video segments at the bitrate of 2 megabits per second (Mbs or Mbps). If the UE's ABR client has a playback buffer 302 of size 32 MB, that buffer may be able to accommodate twelve (12) such 2 Mbs segments (assuming that each segment contains 10 seconds of video). As a result, the UE would have 2 minutes (12 segments×10 seconds/segment) of High Quality (HQ) playback time as exemplified by the buffer configuration 302, which the UE's player would continue to play from its buffer. When the UE/vehicle 308 starts approaching the outage area 312 as indicated by the example travel direction 306, the network entity may determine—based on UE/vehicle's speed and direction of travel—that the UE/vehicle 308 would "hit" the outage region 312 in the next 7.1 minutes, as exemplified by the illustrative calculation block 314. As shown, the estimated direction/heading of the vehicle is such that the radio signal quality becomes progressively less desirable, as exemplified by signal strength bars 305, 307 and 309, before the outage area 312 is encountered. In one embodiment, whenever a UE/vehicle is within certain time interval (e.g., 7 to 8 minutes of travel time or its corresponding distance based the vehicle's velocity) from the outage region 312, the network entity may force the UE to switch to a lower bitrate for playback of video content (e.g., the lowest bitrate in the video content's manifest file). Hence, in the illustrative representation 300 of FIG. 3, when the network entity determines that the UE/vehicle 308 is heading toward the outage region 312 and would 'hit" that region in the next 7.1 minutes, the network entity may reduce its segment delivery bitrate to 600 Kbps as indicated at the example calculation block 314. As a result, the UE's ABR player would be forced to select the lowest bitrate in the manifest (e.g., 500 Kbps) to download video segments from the network's content delivery server. Instead of the previous HQ segments at 2 Mbps, the client player would be now forced to start maintaining its playback buffer with Low Quality (LQ) video segments downloaded at the lowest manifest bitrate of 500 Kbps, as illustrated by the buffer configuration 304. This process may continue as shown by the buffer configurations 316 and 318 and conclude when the entire playback buffer is filled with such LQ video segments.

When the UE/vehicle is physically closest to the outage region—as indicated by reference numeral 310—the client's playback buffer would be filled with enough 500 Kbps segments to allow the UE/vehicle "traverse" the outage area 312 without playback interruption. In the embodiment of FIG. 3, it is shown that the client's 32 MB playback buffer is now filled with a plurality of LQ (500 Kbps) video segments, each segment containing 10 seconds of video, which would allow the client to have about 8.5 minutes (e.g., 51 segments×10 seconds/segment) of LQ play. If the UE-carrying vehicle 308 is traveling at 60 MPH, this would allow uninterrupted video playback for the next 8.5 miles of travel distance, which may be significantly more than the "size" (in terms of the traversal distance) of the outage region 312 in the vehicle's direction of travel. Additional details regarding forced delivery rate techniques may be found in one or more of the following commonly owned co-pending U.S. patent application(s): (i) "ADAPTIVE VIDEO WHITE SPOT LEARNING AND USER BANDWIDTH DELIVERY CONTROL SYSTEM", application Ser. No. 14/036,841, filed Sep. 25, 2013, in the name(s) of Christopher Phillips et al., cross-referenced hereinabove and hereby incorporated by reference herein.

Figure 4A:
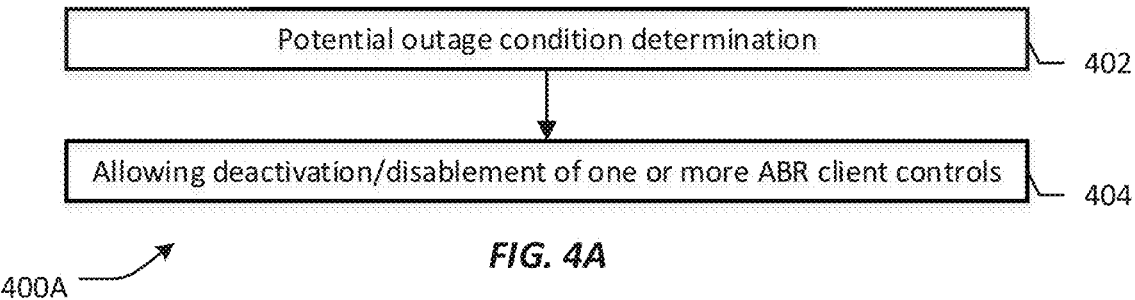
FIGS. 4A-4C depict flowcharts of various blocks, steps and/or acts that may be combined in one or more arrangements that illustrate one or more embodiments of the present patent disclosure for modulating ABR client controls while traversing a white spot area of a wireless network environment.
Figure 4B:
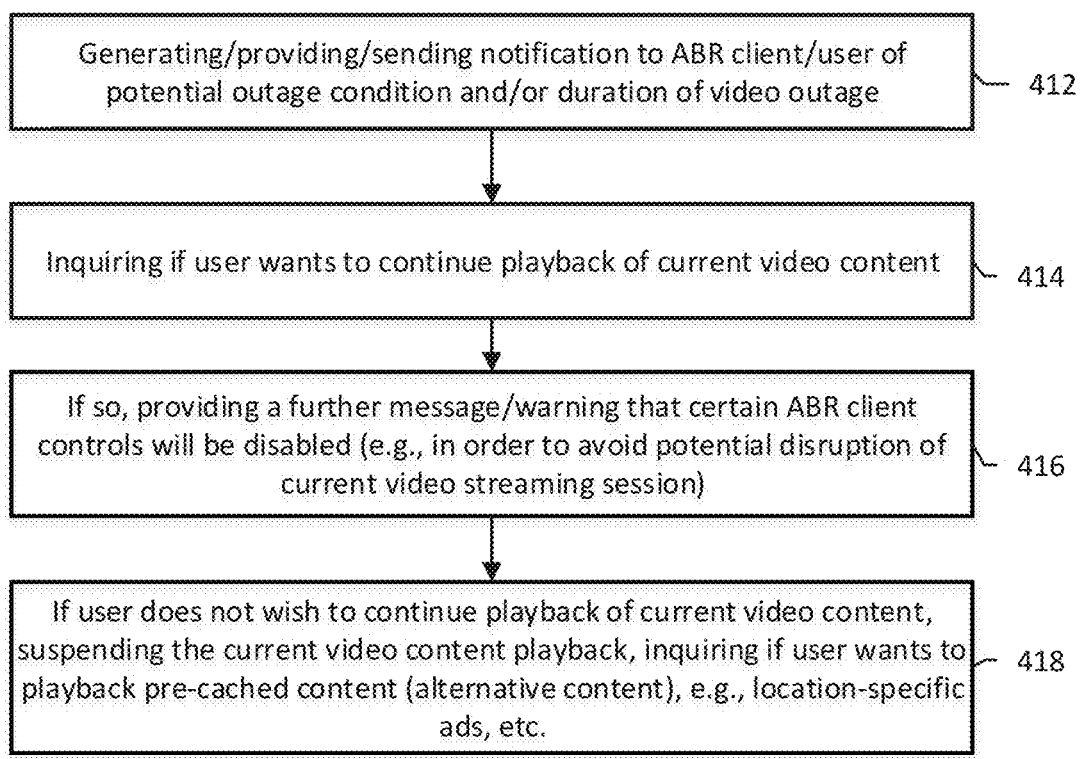
Figure 4C:
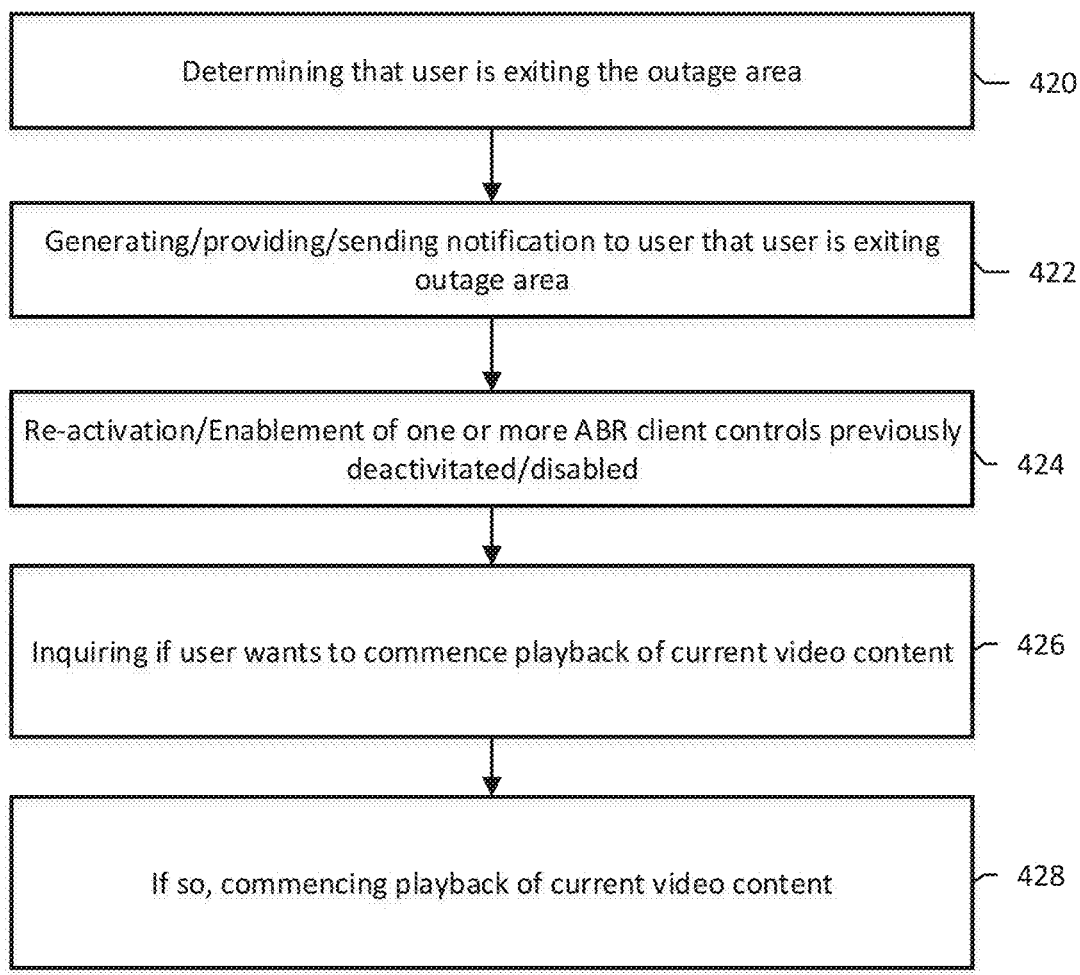

Whereas a forced bitrate control technique employing buffer priming, e.g., in accordance with the embodiments set forth above, may allow an ABR client to continue to play back video content while passing through a known outage area, engaging some client player functionalities by users during such playout may give rise to unexpected—and potentially disruptive—results, however. For example, if the user decides to change the current content streaming session (i.e., switching the current streaming channel) to receive some other content, not only the ABR player will not be able to switch to the intended new channel, it may experience glitches if it decides to switch back to the "old" channel. Also, it may not be possible to engage in any trick mode or trick play that mimic actions such as, e.g., fast-forwarding or rewind, etc., while playing out from the primed video buffer, thereby leaving the user somewhat less than satisfied with the playback experience. FIGS. 4A-4C depict flowcharts of various blocks, steps and/or acts that may be combined in one or more arrangements that illustrate one or more embodiments of the present patent disclosure for modulating or otherwise selectively controlling channel changing or other navigational controls of the client player while traversing a radio white spot area of a wireless network environment. Reference numeral 400A in FIG. 4A generally refers to a broad methodology for allowing deactivation or disablement of one or more ABR client controls of a wireless UE device engaged in a forced bitrate streaming session according to one embodiment. For purposes of the present patent application, the wireless UE device may be configured to receive or otherwise consume various types of content via streaming sessions effectuated over a suitable wireless connection, which streaming sessions may at least partly involve delivery or distribution of convent via a delivery network such as CDN 116 coupled to the wireless network serving the wireless UE device regardless of whether the wireless network is a home network or a visited network. As one skilled in the art will appreciate, example CDN 116 may comprise an overlay network architected for high-performance streaming of a variety of digital assets or program assets as well as services (hereinafter referred to as "content") to subscribers, including wireless/mobile equipment users, using one or more Internet-based infrastructures, private/dedicated infrastructures or a combination thereof. In general, the terms "content", "content file", or "media segment" and the like as used in reference to at least some embodiments of the present patent disclosure may include digital assets and program assets such as any type of audio/video content or program segment, live or static (e.g., recorded over-the-air free network television (TV) shows or programs, pay TV broadcast programs via cable networks or satellite networks, free-to-air satellite TV shows, IPTV programs, etc.), Over-The-Top (OTT) and video-on-demand (VOD) or movie-on-demand (MOD) shows or programs, time-shifted TV (TSTV) content, as well as other content assets provided by content publishers, owners or providers, including but not limited to software files, executable computer code or programs, online electronic games, Internet radio shows/programs, entertainment programs, educational programs, movies, music video programs, and the like, that may be delivered using any known or heretofore unknown streaming technologies. By way of illustration, content delivered via the serving wireless network (e.g., carrier network 102) may be encoded using suitable ABR streaming techniques to support Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on.

In general, the overlay architecture of CDN 116 may include a multi-level, hierarchically-organized interconnected assembly of network servers for providing media pathways or "pipes" from one or more central distribution nodes to one or more levels of regional distribution nodes that are connected to one or more local edge servers and/or radio network entities configured to serve a plurality of end users or subscribers in respective serving location areas. In addition to such "distribution servers", CDN 116 may also include and/or interoperate with various network elements configured to effectuate request redirection or rerouting mechanisms as well as related back office systems or nodes such as operator/subscriber policy management systems, bandwidth scheduling systems, account/billing systems, and the like, that may be deployed as part of a streaming network back office infrastructure (not specifically shown in FIG. 1).

Continuing to refer to FIG. 4A, a determination may be made at block 402 that the wireless UE device including a suitable ABR client and currently engaged in an ABR streaming session is heading towards and/or entering a radio white spot area based on a variety of techniques for positioning/locating and estimating a travel direction of a mobile device known in the art. For example, such techniques may comprise positioning methods based on radio cell coverage, Global Positioning System (GPS), Assisted GPS (A-GPS), Global Navigation Satellite System (GLONASS), Galileo, or other satellite based systems/methods, or Time-Of-Arrival (TOA), Uplink Time Difference Of Arrival (UTDOA), Observed Time Difference Of Arrival (OTDOA), or Enhanced Observed Time Difference (E-OTD) methods. In general, additional description of the positioning methods in a cellular network may be found in such 3GPP Technical Specifications (TS) as, for example, the TS 36.305 (E-UTRAN; Stage 2 functional specification of UE positioning in E-UTRAN), the TS 25.305 (Stage 2 functional specification of UE positioning in UTRAN), and TS 43.059 (Functional stage 2 description of Location Services (LCS) in GERAN). Many of these positioning methods may be based on network triangulation, Wi-Fi positioning, and/or wireless UE device's internal sources such as accelerometers, position sensors, etc., in addition to utilizing speed/direction estimations of a vehicle in which the wireless UE device may be operating. Accordingly, given a set of current location coordinates of the wireless UE device (and/or the vehicle) as well as a speed/direction estimate associated therewith, it can be anticipated as to where and when the vehicle and its UE device (hereinafter, the terms "vehicle" and "wireless UE device" operating therein will be used somewhat interchangeably for purposes of the example embodiments unless otherwise expressly noted) will encounter radio white spots over a projected route and/or duration of time by querying a suitable video outage database.

After determining that the wireless UE device is in a radio white spot area and the client player is playing out or will play out from the video buffer primed with lower quality segments as discussed above, one or more client controls may be disabled or deactivated (block 404). For example, such client controls may comprise functionalities such as channel change, fast-forward, rewind, and/or trick mode. Reference numeral 400B in FIG. 4B generally refers to at least a portion of additional features and associated blocks that may be added, replaced, or supplemented, either alone or in any combination, in respect of the ABR client control modulation/modification process 400A described above. As one variation, for example, a notification may be provided to the ABR client informing the user of the outage condition and/or its duration (block 412) that may be estimated as discussed above in reference to FIG. 3. A further determination or inquiry may be made as to whether the user wants to continue with the current ABR streaming session (e.g., continue to play back the video content out of the primed buffer), as set forth at block 414. If so, a further message, warning, alert or notification may be provided (block 416) to indicate that certain ABR client controls will be disabled while in the outage area (e.g., for a specific time duration in order to avoid potential disruption of the current video streaming session). If the user does not wish to continue with the current streaming session, the playback of the primed buffer content may be suspended, terminated or otherwise disabled. In a still further variation, yet another inquiry may be as to whether the user wants to play back certain pre-cached local content (which may be referred to as alternative content). Accordingly, in certain additional or alternative embodiments, the ABR client of the wireless UE device may be instructed to commence playback of other content locally cached or otherwise buffered at the wireless UE device while the ABR streaming session is in a deactivation/redirection/suspension mode (block 418). For example, the locally available alternative content may comprise advertisements, weather reports, news clips, etc., that may be relevant with respect to (i) the video outage area that the wireless UE device is in; (ii) demographic information of the wireless UE device user; (iii) the user's estimated travel route passing through the video outage area; and/or some other user- or network-specified information identified for preloading, etc., in any combination thereof. The amount of such alternative content available for playback or play-out may be predetermined based on the estimated time it may take for the vehicle/UE device to traverse a particular video outage area. Additional details regarding playback of alternative content while in an outage area may be found in one or more of the following commonly owned co-pending U.S. patent application(s): "ABR VIDEO WHITE SPOT COVERAGE SYSTEM AND METHOD", application Ser. No. 14/200,491, filed Mar. 7, 2014, in the name(s) of Johan Köhli et al.; cross-referenced hereinabove and hereby incorporated by reference herein.

FIG. 4C depicts a flowchart of a process 400C involving various steps/blocks that may take place relative to a UE/vehicle exiting the outage area wherein the UE's ABR client controls have been disabled. Upon determining that the UE/vehicle is exiting the outage area (block 420), a notification may be generated or otherwise provided to or obtained by the UE device to that effect (block 422). One or more ABR client controls that were previously deactivated/disabled may be re-activated or enabled, e.g., upon query and/or responsive input from the user (block 424). If the video streaming session was also suspended while traversing the outage area, a further determination may be made as to whether the user wants to (re)commence or resume the playback of the suspended streaming session, e.g., from the point where it was suspended (i.e., from a media segment adjacent to the particular segment that was last played), as set forth at blocks 426 and 428.

It should be appreciated that the foregoing blocks, steps and/or acts of FIGS. 4A-4C may be arranged or re-arranged in several combinations, yielding a variety of embodiments and implementations. Further, the various blocks, steps and/or acts may be executed at or by different entities (e.g., by one or more network-side entities, a UE device, or both). It should therefore be appreciated that features such as outage area notification, ABR client control deactivation/disablement, etc., may be network-initiated or client-initiated, depending on where some of the foregoing blocks, steps and/or acts may take place. Additional details with respect to one or more of such embodiments may be exemplified in view of the following Figures described below.

Figure 5:
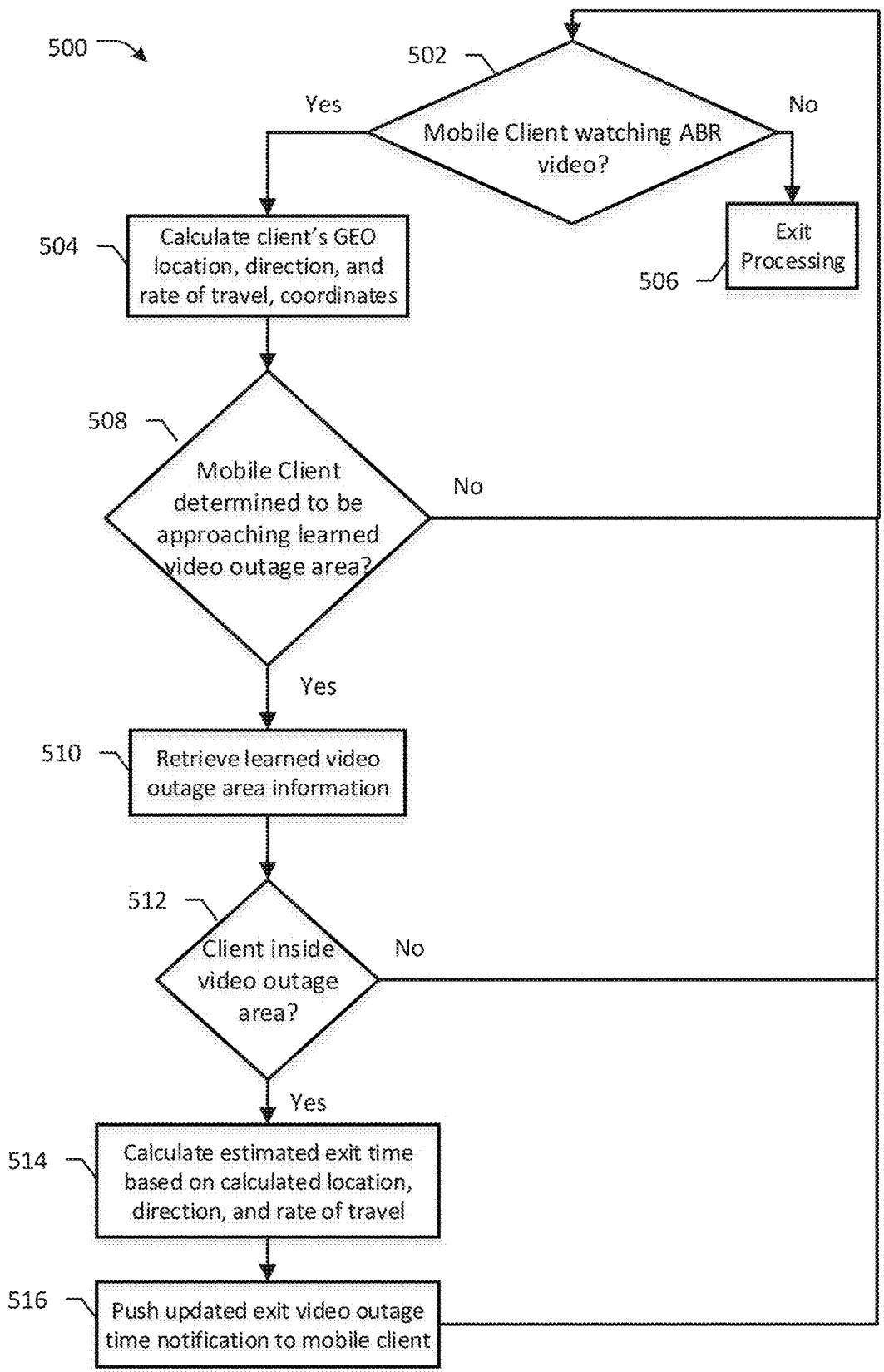
FIGS. 5, 6 and 7A-7B depict flowcharts of additional details with respect to one or more embodiments of the present patent disclosure.

FIG. 5 depicts a flowchart of an example video session tracking and location update notification process 500 according to an embodiment of the present patent application. At block 502, a query or determination is made if a mobile client is watching or playing ABR video. If the mobile client is not currently engaged in an ABR video session, the process flow is terminated (block 506). Otherwise, the mobile client's geo-location, direction, travel coordinates, etc. are calculated or otherwise determined (block 504). If the mobile client is determined to be approaching a video outage area (e.g., based on querying a learned video outage location database, either locally stored or at a network element as described hereinabove), the outage area information is retrieved, as set forth at block 508 and 510. If the client is inside the video outage area (block 512), an estimated exit time may be calculated based on the location, direction and rate of travel (block 514). In an implementation where the foregoing acts are executed at a network element, the estimated exit time may be pushed to the mobile client via a suitable notification scheme (block 516). It should be appreciated that in an alternative embodiment where the acts may be executed at the mobile UE device (e.g., because the mobile UE device has a copy of the learned video outage location database or at least a relevant portion thereof), there will be no need to push such notifications to the device. Regardless of where the steps/acts may take place, however, the process flow may be executed iteratively until it is determined that session tracking and update notifications are no longer necessary.

Figure 6:
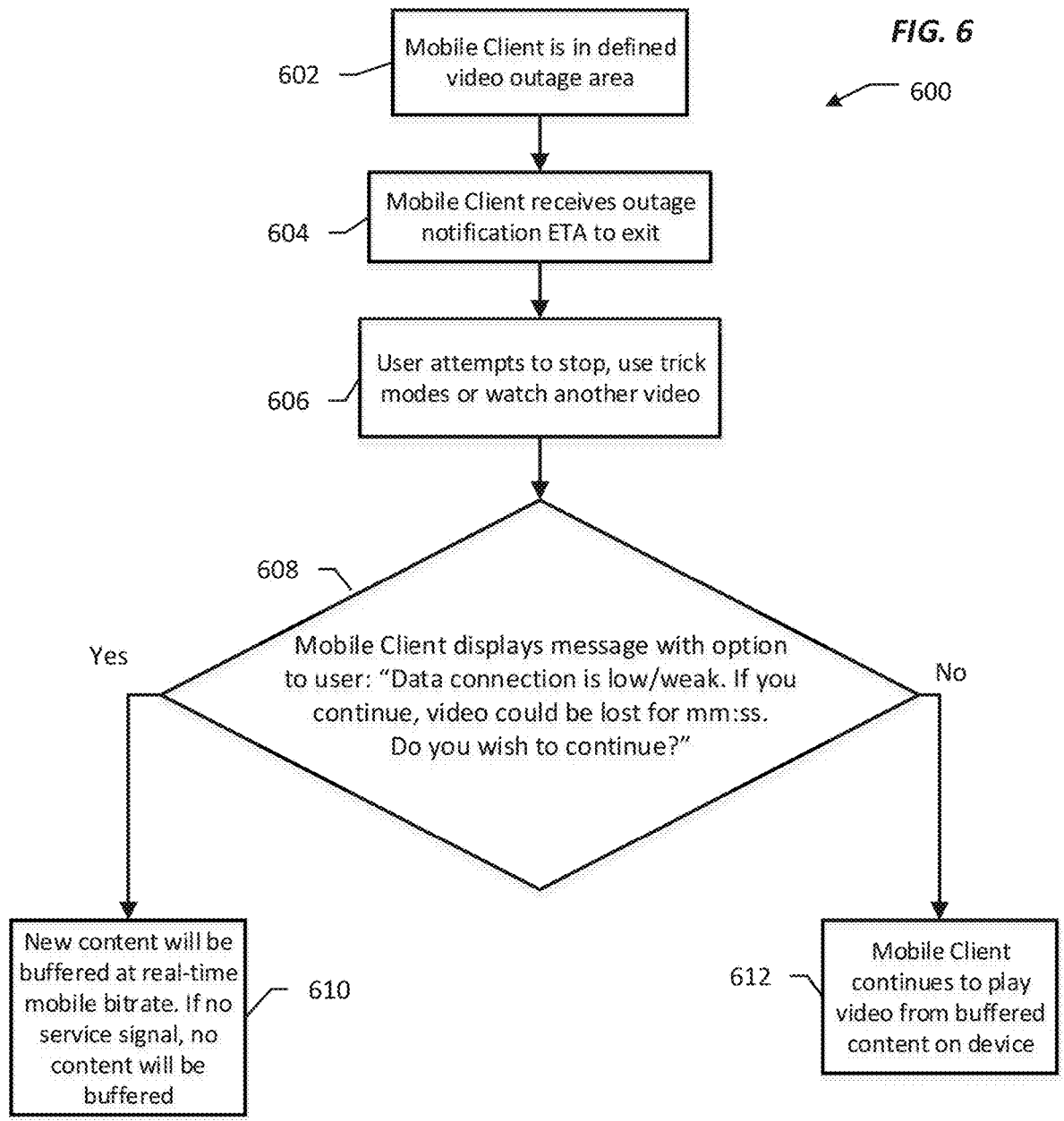

FIG. 6 depicts a flowchart of an example process 600 with respect to providing client-specific ABR notifications according to an embodiment of the present patent disclosure. Upon determining that the mobile client is in a defined video outage area (block 602), a notification may be provided to or obtained by the mobile client, which notification may include related information such as estimated outage time, time to exit the outage area, etc. (block 604). When the user attempts to engage an ABR client control (e.g., using a trick mode or change to a different channel to watch another video), a client-specific message may be presented to the user (e.g., on a display), as set forth at blocks 606 and 608. By way of example, the client-specific message may comprise a query that requires user input, such as, for instance: "Data connection is low/weak. If you continue, video could be lost for mm:ss. Do you wish to continue?" If the user does not wish to continue with the specific ABR client control process, appropriate input may be provided, whereupon the mobile client continues to play the buffered content as described previously (block 612). On the other hand, if the user input is affirmative, the new requested content may be buffered at real-time bitrate (assuming that channel change was the ABR client control activated by the user), if the radio signal conditions allow such buffering. If there is no service signal of suitable quality, the requested content will not be buffered, however, as set forth at block 610.

Figure 7:
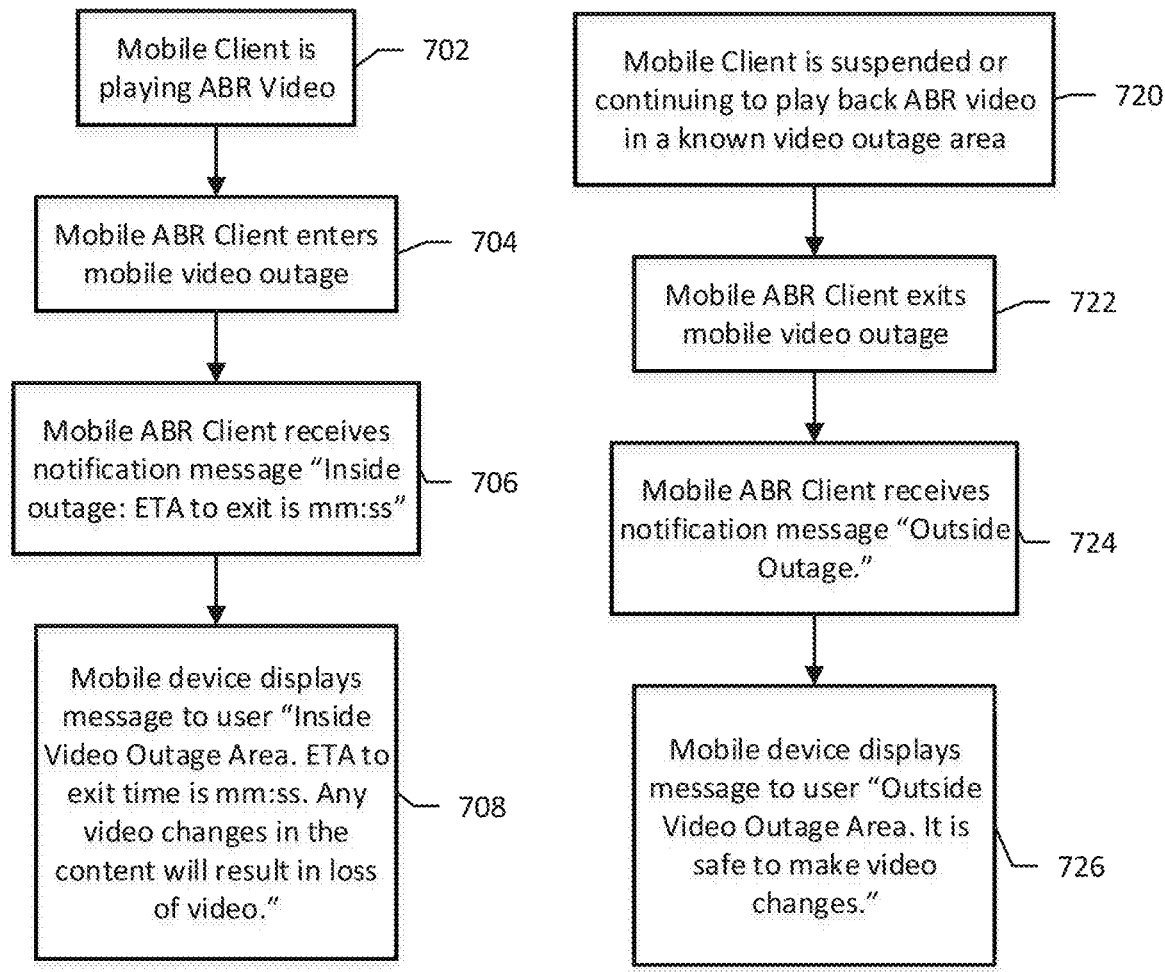

FIGS. 7A and 7B depict flowcharts of example processes of non-client-specific notification schemes (i.e., schemes that may not necessarily require or provide for user input) according to additional embodiments of the present patent disclosure. Reference numeral 700A in FIG. 7A generally refers to various blocks, steps or acts relative to notification messaging when a mobile client/device enters an outage area. Similar to some of the processes set forth hereinabove, the mobile client that is currently playing ABR video enters an outage area, as set forth at blocks 702 and 704. A notification message indicating that the mobile device is within the outage area (e.g., "Inside outage: ETA to exit is mm:ss") is provided to the client (block 706). Additional messaging text, alerting or warning may be included in a display message to inform the user that any changes to the current video session may result in service disruption, as exemplified in block 708. Turning to FIG. 7B, reference numeral 700B therein generally refers to various blocks, steps or acts relative to notification messaging when a mobile client/device exits an outage area. As discussed above, the mobile client/device may be suspended, or playing ABR video content from the primed buffer, or playing alternative content while it is in the outage area (block 720). Regardless, upon determining that the mobile client/device is exiting the outrage area (block 722), a notification message (e.g., "Outside Outage") may be provided (block 724). Similar to some of the processes set forth hereinabove, additional information may be included in a display message to inform the user that it is safe to engage in ABR client controls (e.g., changing a streaming channel), as exemplified in block 726.

Figure 8:
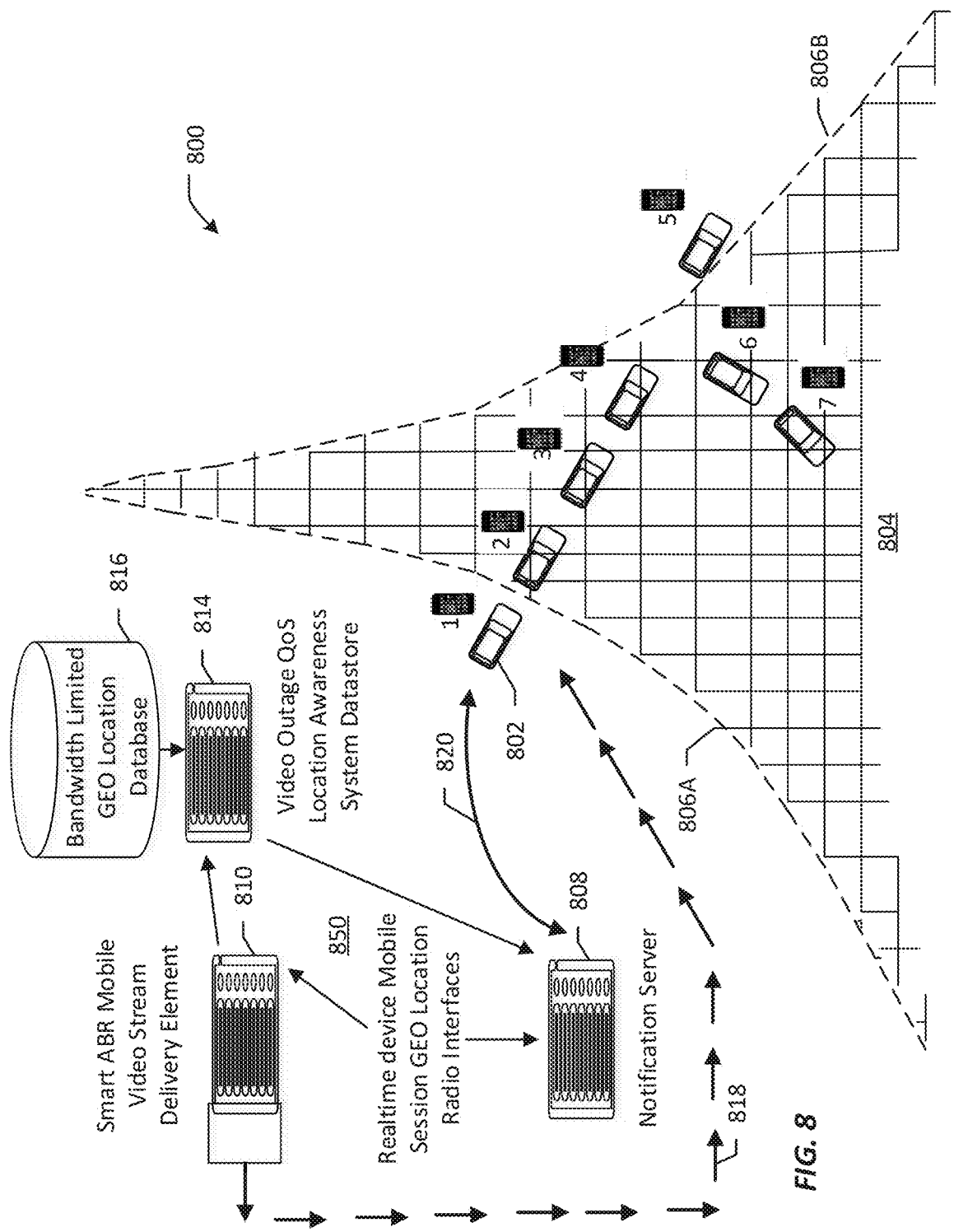
FIG. 8 depicts additional details with respect to an example wireless network environment optimized for ABR streaming and associated client control according to an embodiment of the present patent disclosure.

FIG. 8 depicts additional details with respect to a portion of an example wireless network environment 800 optimized for ABR streaming and associated client control according to an embodiment of the present patent disclosure. Reference numeral 850 generally refers to a system or sub-system of one or more network elements operative to effectuate various network-centric acts or processes described in detail hereinabove. In one implementation, at least a portion of the network elements 850 may form a radio network controller node (e.g., node 106 in FIG. 1) configured to serve a mobile UE/vehicle 802 via suitable BS network infrastructure (not specifically shown in FIG. 8). For example, a mobile-optimized ABR stream delivery server 810 may be provided as part of such a network controller node which may be configured to deliver ABR content to mobile client devices via respective sessions established through the serving base stations of the wireless network environment 800, wherein the content being delivered may originate from any number of content sources and/or may involve appropriate CDN infrastructure elements (not shown in FIG. 8). Accordingly, at least in one embodiment, the ABR stream delivery server 810 may be provided with appropriate radio interfaces with respect to the serving base stations and may be configured to maintain/monitor mobile client devices' real-time user sessions. By way of illustration, reference numeral 818 refers to a user streaming session effectuated with the mobile client/vehicle 802, wherein a segment pull rate of 150 Kbs and lowest ABR encoded bitrate of 400 Kbs are exemplary. The ABR stream delivery server 810 may also interface with a video quality location awareness server or subsystem 814 and associated geo-location database 816 having relevant video outage area information. In one implementation, such a database may be developed using a learning process described above with respect to FIG. 2, which may be augmented with additional features set forth in one or more commonly-owned patent applications cross-referenced previously. The ABR stream delivery server 810 may further include or otherwise be associated with a sub-system called Segment Encoding and User Session Segment Delivery and Alternative Content Push control module (which may also be referred to as a "delivery module" or "delivery control module" herein, not specifically shown in FIG. 8), that may be configured to monitor delivery bitrate/bandwidth for the streaming content delivered by the ABR stream delivery server 810 as well as effectuate the delivery of alternative content (e.g., advertisements). As described in one or more above-referenced commonly-owned patent applications, the delivery module may be integrated as part of the ABR stream delivery server 810 to provide manifest files for media segments to the UE devices in addition the alternative content delivered to the UEs pursuant to respective ABR streaming sessions.

Continuing to refer to FIG. 8, the ABR stream delivery server 810 may also be interfaced with a location update and outage-aware notification server 808 that is configured for generating and providing appropriate notifications and/or messages to the mobile client devices as they enter or approach a video outage area. In one example implementation, such notification messages may comprise a video-encoded still image of a message (text, graphics, etc.) configured to apprise the user of any information relevant with respect to the streaming session, e.g., to the effect that an outage has occurred and/or alternative content may be played in lieu of the requested content for a certain predetermined time and/or deactivation of client controls and warnings relative thereto, for instance. Additional details regarding video-encoded notification messaging may be found in one or more of the following commonly owned co-pending U.S. patent application(s): (i) "CONFLICT DETECTION AND RESOLUTION IN AN ABR NETWORK", application Ser. No. 14/194,868, filed Mar. 3, 2014, in the name(s) of Christopher Phillips et al.; and (ii) "CONFLICT DETECTION AND RESOLUTION IN AN ABR NETWORK USING CLIENT INTERACTIVITY", application Ser. No. 14/194,918, filed Mar. 3, 2014, in the name(s) of Christopher Phillips et al.; cross-referenced hereinabove and hereby incorporated by reference herein.

Illustratively, video outage area 804 having an ingress boundary 806A and an egress boundary 806B is a rendition of the learned outage area the mobile client/vehicle is estimated to traverse, whose location updates are available to the notification server 808 via a suitable communication interface 820. The notification server 808 is also interfaced with the video quality location awareness server or subsystem 814 and associated geo-location database 816 such that appropriate notifications, including outage entry/exit notifications, ABR client control deactivation/enablement messages, warnings, as well as corresponding updates and the like, may be provided to the mobile client as the vehicle carrying it traverses the outage area and/or changes its direction within the area, Initially, the vehicle's path may be estimated to traverse locations 1-5 crossing both ingress and egress boundaries 806A/806B, whereupon suitable entry and/or exit notifications may be provided to the mobile client. If the vehicle 802 changes its direction within the outage area 804, e.g., as illustrated by locations 6 and 7, updated location data may cause the notification server 808 to generate updated notifications and messages to be mobile client in accordance with the teachings set forth herein.

Figure 9:
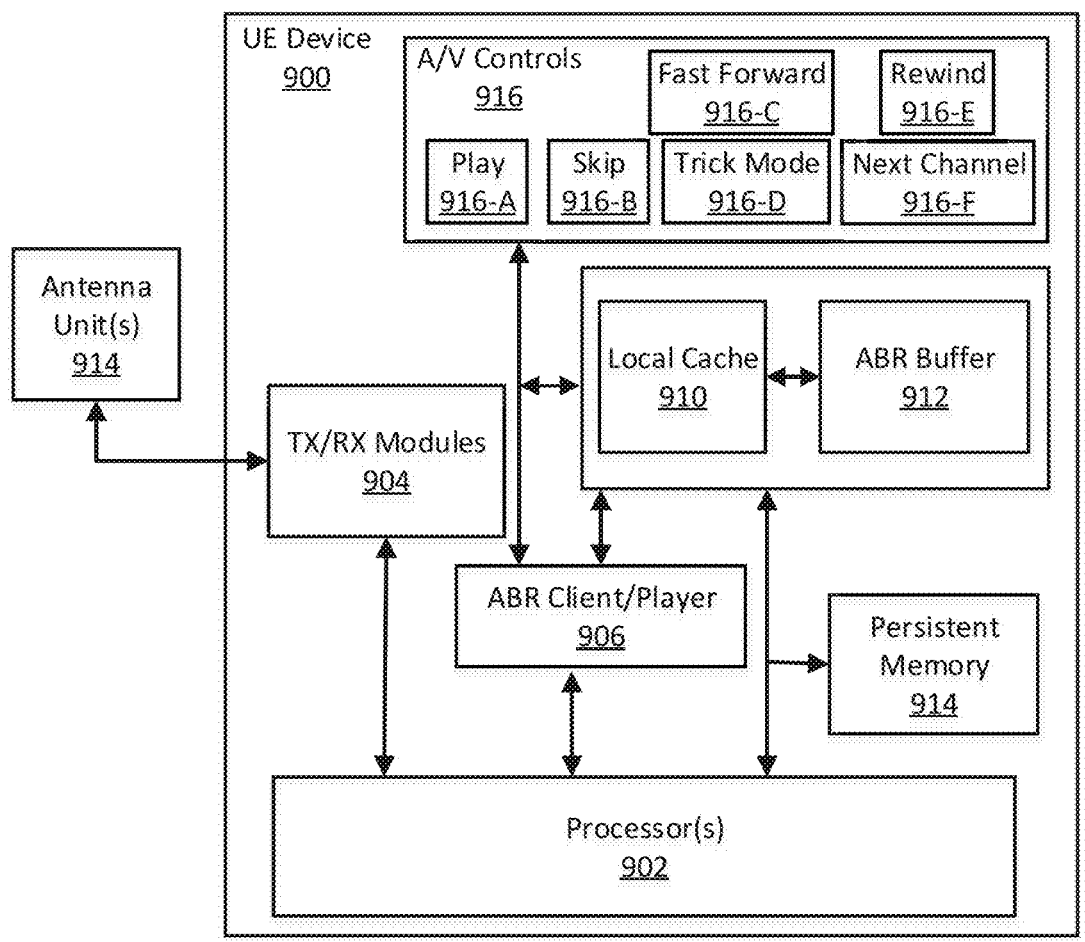
FIG. 9 depicts a block diagram of an example wireless user equipment (UE) device including an ABR client configured to execute certain aspects according to one or more embodiments of the present patent application.

FIG. 9 depicts a block diagram of an example mobile device or wireless UE device 900 including an ABR client/player 906 configured to execute certain aspects under control of processor(s) 902 according to one or more embodiments of the present patent application. Appropriate transceiver (Tx/Rx) circuitry 904 coupled to one or more antenna units 914 is operative to effectuate radio communications for purposes of the present disclosure including, e.g., streaming of media, notification messaging, pre-caching of alternative content, etc. in addition to other standard cellular telephony/data communications. The ABR client 906 is operative to play out segments stored in an ABR buffer 912, which may be primed with lower quality segments for playback in an outrage area as described above. A local cache 910 is operative to store preloaded content 810 in certain embodiments, preferably for alternative content that may be downloaded from a network entity while the mobile device 900 is in a radio coverage area having sufficient signal quality for supporting an overall bandwidth rate that is greater than a bandwidth rate necessary for facilitating streaming of highest bitrate content possible at a particular location.

As illustrated, the ABR client/player 906 is provided with a plurality of ABR client controls 916 that may be selectively operated by users for controlling user experience. Such ABR client controls may comprise audio controls as well as video controls available with respect to a streaming session and may include Play 916-A, Skip 916-B, Fast Forward 916-C, Trick Mode or Trick Play 916-D, Rewind 916-E, and Next Channel or Channel Change 916-E. A persistent memory module 914 may be provided for storing appropriate program code or software instructions that may be executed by processors 902 for effectuating outage message processing, display of notifications, ABR client control modulation, etc. in conjunction with other modules of the mobile device 900.

Figure 10:
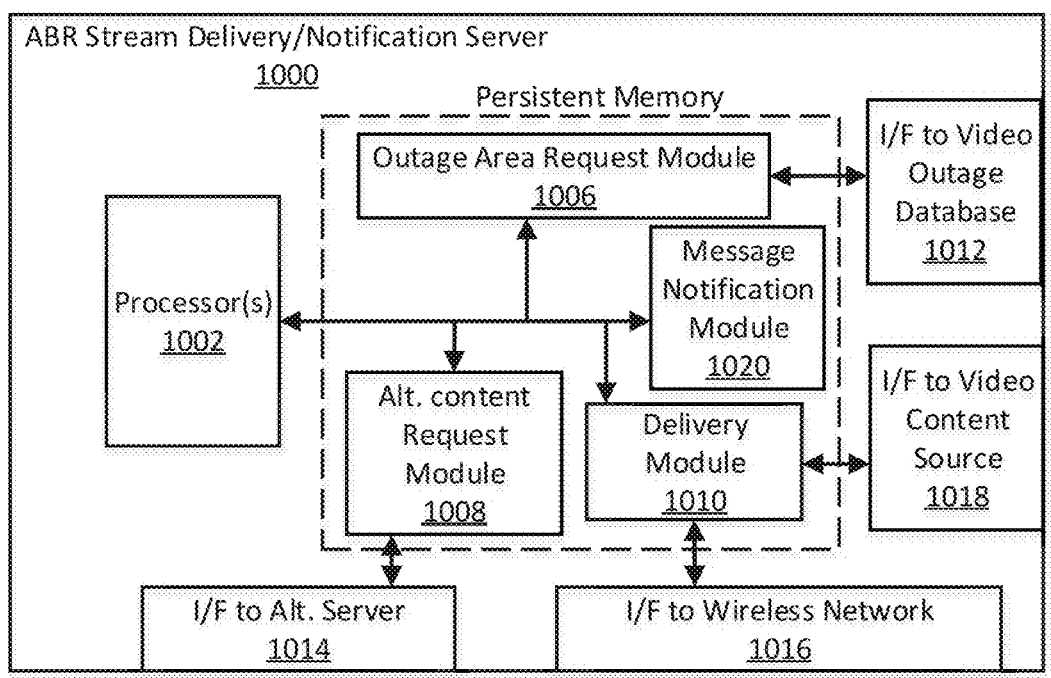
FIG. 10 depicts a block diagram of an example network element configured to execute certain aspects according to one or more embodiments of the present patent application.

FIG. 10 depicts a block diagram of an example network element 1000 configured to execute certain aspects according to one or more embodiments of the present patent application. By way of illustration, network element 1000 is exemplary of a mobile-optimized ABR stream delivery server and/or associated delivery control module as well as a notification server as described above, which may be provided as part of an RNC in certain embodiments. One or more processors 1002 may be provided for controlling a plurality of subsystems, at least a portion of which may be implemented as a combination of hardware and software modules stored as instructions or program code in suitable persistent memory 1022. An outage area request module 1006 is operative to effectuate suitable request/response mechanisms for obtaining video outage area information via an interface (I/F) 1012 to appropriate video QoS-aware location servers/databases described hereinabove. Optionally, an alternative content request module 1008 may be provided that is operative to effectuate suitable request/response mechanisms for obtaining segments of alternative content based on the video outage information and/or user demographic information, etc., via an interface 1014 to one or more alternative content servers/databases. In a notification server implementation, the network element may also include a message notification module 1020 for obtaining and/or generating suitable notification messages (e.g., video-encoded messages) regarding outage area entry/exit, related timing information, ABR client control deactivation, etc. to a mobile client in accordance with the teachings set forth hereinabove. A delivery control module 1010 is operative to effectuate segment encoding, user session segment delivery as well as appropriate bandwidth control for sessions via radio interfaces 1016 with respect to a serving wireless network. Additionally, network element 1000 may also include appropriate interfacing 1018 with respect to content sources and/or associated delivery networks.

Based upon the foregoing Detailed Description, it should be appreciated that one or more embodiments of the present disclosure can be advantageously implemented in a number of wireless ABR streaming environments that may include legacy client applications and/or custom client applications. By detecting potential video outage areas in a wireless network and appropriately notifying the users in a preemptive fashion (e.g., before the users attempt to change ABR player controls), better user experience may be achieved in a video streaming environment, for example.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. For example, at least some of the nodes shown in the wireless streaming network environment of FIG. 8 such as the ABR stream delivery server and/or associated delivery control module, notification/message generation system, video outage area location server and associated database(s), for example, may be integrated or otherwise co-located in different combinations, including as part of an RNC node. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for controlling an adaptive bitrate (ABR) streaming client engaged in a current ABR streaming session, the method comprising:
   determining that a mobile device executing the ABR streaming client is approaching an area where radio coverage is suboptimal for streaming content, wherein the mobile device includes an ABR buffer for storing media segments encoded at different bitrates pursuant to a current ABR streaming session;
   preloading content into the ABR buffer to provide a forced bitrate streaming session to last an estimated time interval while the mobile device is in the area where radio coverage is suboptimal for streaming content;
   providing a notification to the mobile device with respect to the area where radio coverage is suboptimal for streaming content, the notification including a time interval estimate of video outage while the mobile device is in the area where radio coverage is suboptimal for streaming content; and
   disabling certain ABR client controls for the time interval's duration while the mobile device is in the area where radio coverage is suboptimal for streaming content and the mobile device is engaged in the forced bitrate streaming session.

2. The method as recited in claim 1, further comprising:
   inquiring whether a user of the mobile device wants to continue with the current ABR streaming session,
   based on a determination that the user does not want to continue with the current ABR streaming session, suspending the current ABR streaming session; and
   playing back pre-cached alternative content stored in a local cache at the mobile device.

3. The method as recited in claim 1, wherein disabling the certain ABR client controls includes disabling at least one of a channel change, fast forward, rewind, and trick mode.

4. The method as recited in claim 1, further comprising:
determining that the mobile device is exiting the area where radio coverage is suboptimal for streaming content; and
enabling the certain ABR client controls that were disabled while the mobile device was in the area where radio coverage is suboptimal for streaming content.

5. The method as recited in claim 4, further comprising:
providing another notification to the mobile device indicating that the mobile device is exiting the area where radio coverage is suboptimal for streaming content, the another notification including an indication that the disabled certain ABR client controls are enabled.

6. The method as recited in claim 1, wherein the acts of determining that mobile device is approaching the area where radio coverage is suboptimal for streaming content, the preloading content into the ABR buffer, and the subsequent disabling of the certain ABR client controls while the mobile device is in the area where radio coverage is suboptimal for streaming content are performed at the mobile device.

7. The method as recited in claim 1, wherein the acts of determining that mobile device is approaching the area where radio coverage is suboptimal for streaming content, the preloading content into the ABR buffer, and the subsequent disabling of the certain ABR client controls while the mobile device is in the area where radio coverage is suboptimal for streaming content are performed in a network subsystem adapted to serve the mobile device.

8. A wireless user equipment (UE) device, comprising:
an adaptive bitrate (ABR) buffer for storing media segments encoded at different bitrates pursuant to a current ABR streaming session;
an ABR client player configured to play back content out of the ABR buffer; and
one or more processors coupled to a persistent memory having program instructions for controlling the ABR client player to:
preload media segments into the ABR buffer to provide a forced bitrate streaming session to last an estimated time interval while the mobile device is in an area where radio coverage is suboptimal for streaming content,
obtain a notification with respect to the area where radio coverage is suboptimal for streaming content, the notification including a time interval estimate of video outage while the mobile device is in the area where radio coverage is suboptimal for streaming content, and
disable certain ABR client controls for the time interval's duration while the mobile device is in the area where radio coverage is suboptimal for streaming content and the mobile device is engaged in the forced bitrate streaming session.

9. The wireless UE device of claim 8, wherein the one or more processors coupled to the persistent memory having program instructions further facilitate the following:
inquire whether a user of the mobile device wants to continue with the current ABR streaming session;
based on a determination that the user does not want to continue with the current ABR streaming session, suspend the current ABR streaming session; and
play back pre-cached alternative content stored in a local cache at the mobile device upon a user input.

10. A network subsystem configured to control an adaptive bitrate (ABR) streaming client engaged in a current ABR streaming session, the network subsystem comprising:
an adaptive bitrate (ABR) stream delivery server comprising one or more processors coupled to a persistent memory having program instructions for facilitating ABR streaming sessions in a radio network;
a video outage and Quality of Service (QoS) datastore having geographic location data pertaining to areas where radio coverage is suboptimal for streaming content to a mobile device executing the ABR streaming client; and
a video outage awareness and notification node coupled to the ABR stream delivery server and the video outage and QoS datastore,
wherein the video outage awareness and notification node is adapted to:
determine, responsive to a location update from the mobile device, that the mobile device is approaching an area where radio coverage is suboptimal for streaming content, wherein the mobile device includes an ABR buffer for storing media segments encoded at different bitrates pursuant to a current ABR streaming session; and
preload content into the ABR buffer to provide a forced bitrate streaming session to last an estimated time interval while the mobile device is in the area where radio coverage is suboptimal for streaming content,
wherein the video outage awareness and notification node is further adapted to:
obtain a notification with respect to the area where radio coverage is suboptimal for streaming content, the notification including a time interval estimate of video outage while the mobile device is in the area where radio coverage is suboptimal for streaming content; and
provide a message to the mobile device that certain ABR client controls will be disabled for the time interval's duration while the mobile device is in the area where radio coverage is suboptimal for streaming content and the mobile device is engaged in the forced bitrate streaming session.

11. The network subsystem as recited in claim 10, wherein the video outage awareness and notification node is further adapted to:
inquire whether a user of the mobile device wants to continue with the current ABR streaming session;
based on a determination that the user does not want to continue with the current ABT streaming session, suspend the current ABR streaming session; and
instruct the mobile device to play back pre-cached alternative content stored in a local cache at the mobile device.

* * * * *